United States Patent

Kuroda et al.

[11] Patent Number: 5,232,261
[45] Date of Patent: Aug. 3, 1993

[54] DOOR IMPACT BEAM FOR AN AUTOMOBILE

[75] Inventors: Shigeru Kuroda; Ken Takahashi; Hideo Akamatsu; Hidetoshi Gozu, all of Yokohama, Japan

[73] Assignee: NHK Spring Co., Ltd., Yokohama, Japan

[21] Appl. No.: 893,379

[22] Filed: Jun. 4, 1992

[51] Int. Cl.⁵ .......................................... B60R 27/00
[52] U.S. Cl. .................... 296/146.4; 296/188; 52/793
[58] Field of Search ............... 296/146 C, 146 B, 188; 52/793

[56] References Cited

U.S. PATENT DOCUMENTS

| | | | |
|---|---|---|---|
| 4,090,734 | 5/1978 | Inami et al. | 296/146 C |
| 4,684,166 | 8/1987 | Kanodia | 296/146 C |
| 4,796,946 | 1/1989 | Wilson et al. | 296/146 C |
| 4,861,097 | 8/1989 | Wycech | 296/146 C X |
| 4,866,883 | 9/1989 | Brown et al. | 296/146 B X |
| 4,919,473 | 4/1990 | Laimighofer et al. | 296/146 C X |
| 4,978,562 | 12/1990 | Wycech | 296/146 X |
| 5,056,861 | 10/1991 | Garnweidner et al. | 296/146 C X |
| 5,080,427 | 1/1992 | Sturrus et al. | 296/146 C X |
| 5,094,034 | 3/1992 | Freeman | 49/501 |

FOREIGN PATENT DOCUMENTS

| | | |
|---|---|---|
| 3709489C1 | 3/1987 | Fed. Rep. of Germany . |
| 3606024A1 | 8/1987 | Fed. Rep. of Germany . |
| 50813 | 5/1981 | Japan .................. 296/188 |
| 1-99712 | 7/1989 | Japan . |
| 4-75715 | 3/1992 | Japan . |
| 4-78720 | 3/1992 | Japan . |

Primary Examiner—David M. Mitchell
Assistant Examiner—Gary C. Hoge
Attorney, Agent, or Firm—Frishauf, Holtz, Goodman & Woodward

[57] ABSTRACT

A door impact beam, which is arranged in a door panel structure, comprises a beam body, arranged along the longitudinal direction of a door, and attachment portions arranged individually at two opposite ends of the beam body. The beam body is formed of a heat-treated hollow member steel. The attachment portions are individually fixed to the door panel structure. The beam body has a section in the form of a quadrilateral frame having four sides and four rounded corners. The outer radius of curvature R of each of the four corners is adjusted to a value such that the radius R falls within a range of $1.5\,t \leq R \leq 3.5\,t$, where t is the wall thickness of the hollow member.

9 Claims, 8 Drawing Sheets

DOOR IMPACT BEAM FOR AN AUTOMOBILE

BACKGROUND OF THE INVENTION

1. Field of the Invention

The present invention relates to a door impact beam contained in a door of an automobile, and more particularly, to a door impact beam enjoying a good impact absorbing capability.

2. Description of the Related Art

Door impact beams are known as means for reinforcing doors of automobiles. The door impact beams are also referred to as door guard bars. A conventional door impact beam is formed by press-molding a high-strength steel plate into a predetermined shape. This plate-shaped door impact beam is arranged in a door panel structure of an automobile, along the longitudinal direction thereof, and serves to augment the rigidity of the door against a load applied sideways thereto. In case of a flank clash, energy which acts on the door is absorbed by plastic deformation of the door impact beam, whereby users' safety is secured.

Since it is bound to be arranged in the narrow inside space of the door, the conventional plate-shaped door impact beam must be formed of a plate which is wide enough to ensure predetermined energy absorbing capability and door deformation. In this case, the unit plate is considerably heavy, weighing about 5 to 8 kg.

Accordingly, use of a heat-treated steel pipe as a material of the door impact beam has been proposed to reduce the mounting space and weight of the impact beam. The conventional pipe may be a round pipe having a circular section or a square pipe a having a square section, as shown in FIG. 12.

Figure 13:
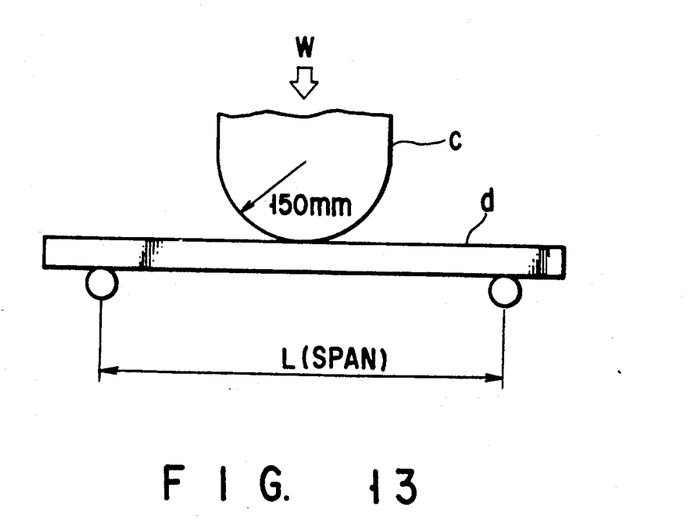
FIG. 13 is a front view showing an outline of a testing apparatus used to evaluate the beam intensity.
Figure 14:
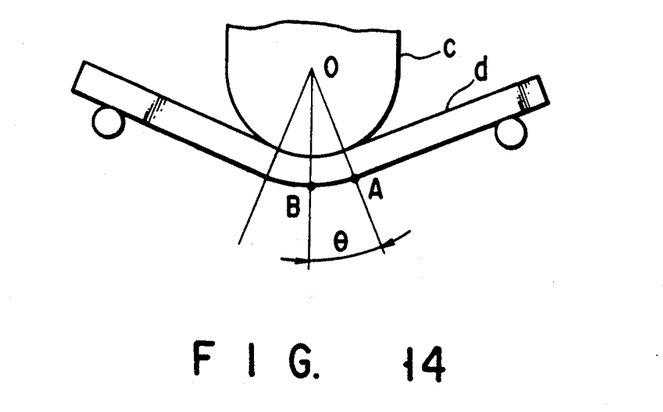
FIG. 14 is a front view showing the testing apparatus, in which a beam is bent.

The strength of the door impact beam is evaluated by using a testing apparatus, such as the one shown in FIG. 13. In this testing apparatus, a load W equivalent to energy produced by a lateral clash is applied to the central portion (with respect to the lengthwise direction) of a beam d, as an object of testing, by means of a pressure member c. As the load W increases, in this case, the beam d bends in the manner shown in FIG. 14, and undergoes a U-shaped plastic deformation. Thus, the beam d touches the pressure member c on points A and B for a tangential angle θ.

Figure 15:
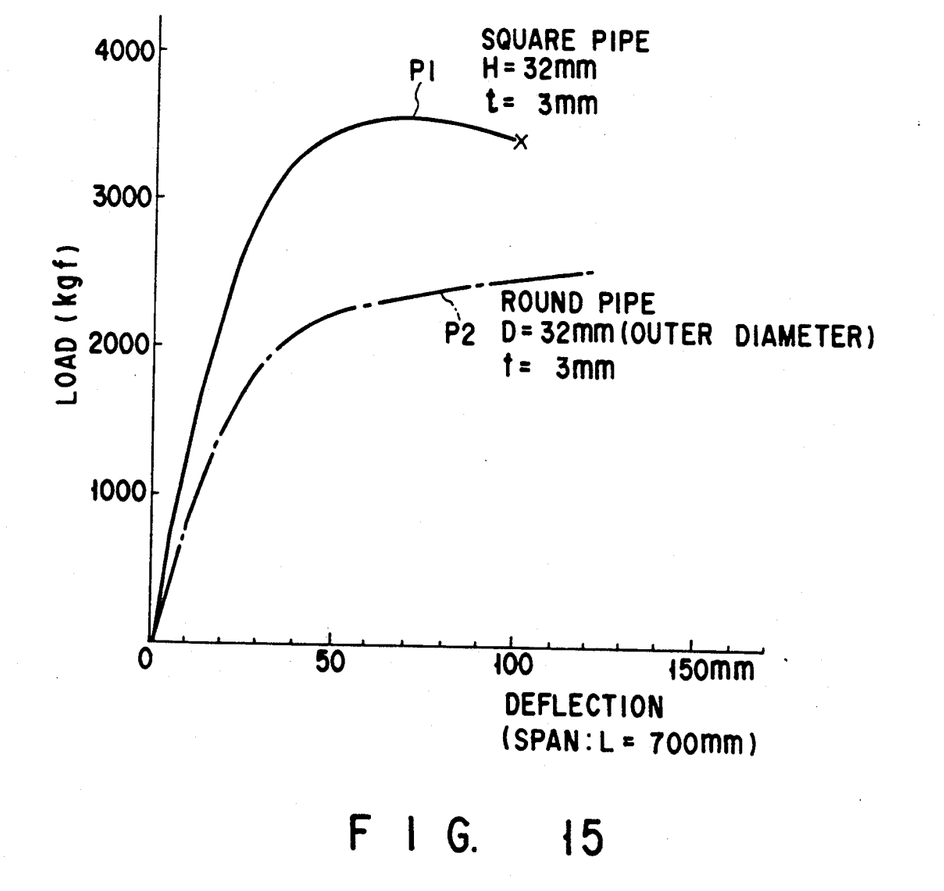
FIG. 15 is a diagram showing the relationships between deflection and load obtained when square and round pipes are bent.

The geometrical moment of inertia of a round pipe is smaller than that of a square pipe of the same outer dimensions and the same wall thickness. In the case of the round pipe, therefore, the initial leading edge gradient of a characteristic curve P2, which represents the relationship between deflection and load, is relatively gentle, as indicated by dashed line in FIG. 15, so that an unreasonable deflection is allowed in a moment of a clash. Thus, the round pipe requires a larger sectional area than that of the square one, thereby entailing an increased weight and the like, in order to obtain the same strength as the square pipe which has the same onter demensions.

Figure 12:
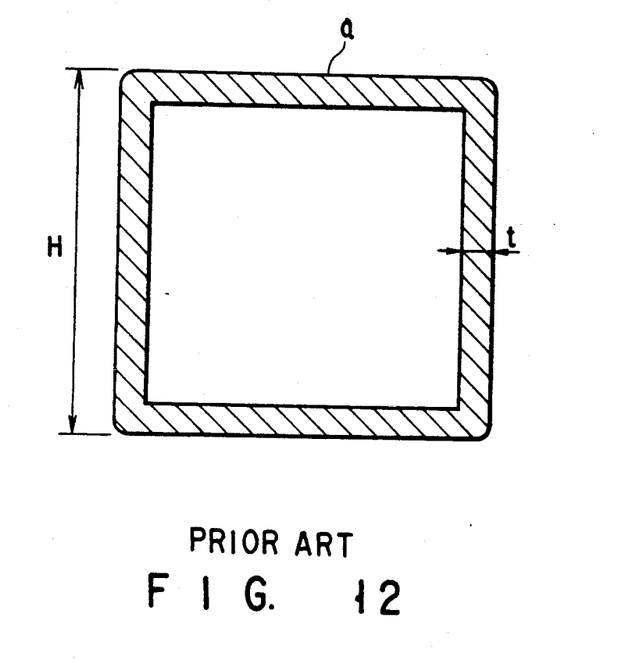
FIG. 12 is a sectional view of a conventional hollow member.

The square pipe a shown in FIG. 12 sometimes suffers a sudden buckling when it is subjected to a measure of deflection after a load equivalent to the energy of a lateral clash is applied to its central portion with respect to the lengthwise direction thereof. Thus, the impact absorbing capability of this pipe is lowered by a smaller deflection than in the case of the round pipe. When a conventional square pipe (H=32 mm, wall thickness t=3 mm, span L=700 mm) with a square section, for example, was bent by means of the aforesaid testing apparatus, it displayed a characteristic curve P1 indicated by full line in FIG. 15, which indicates a breakage by a deflection of 100 mm or thereabout. This level of deflection cannot ensure satisfactory reinforcement of the door. With use of the round pipe having the same sectional area and the same outer dimensions as the square one, however, the leading edge gradient of the characteristic curve P2 is so gentle that the undue deflection is allowed in the moment of the clash, although no buckling is caused. In consequence, round pipes with wide sectional areas are liable to be used, thus resulting in an increase in weight.

SUMMARY OF THE INVENTION

Accordingly, the object of the present invention is to provide a door impact beam capable of being subjected to a substantial deflection before suffering buckling, and displaying a desired strength in a moment of a clash, without easing the leading edge gradient of a characteristic curve which represents the relationship between deflection and load.

According to the present invention, developed in order to achieve the above object, there is provided a door impact beam for use in a door panel structure designed for use in an automobile and having an outer panel and an inner panel, comprising: a beam body formed of a hollow member of heat-treated steel having two opposite ends, arranged along the longitudinal direction of the automobile, and having a section in the form of a quadrilateral frame having four sides and four rounded corners, the outer radius of curvature R of each of the corners being adjusted to a value such that there is a relation $1.5\ t \leq R \leq 3.5\ t$, where t is the wall thickness of the hollow member; and attachment portions arranged individually at two opposite ends of the beam body, and fixed to the door panel structure.

The beam body of the door impact beam according to the present invention can be subjected to a substantial deflection before it suffers buckling, and can enjoy a sharp leading edge gradient in its characteristic curve which represents the relationship between deflection and load. Despite its lightweight, compact design, therefore, the beam body can display a moderate energy absorption performance.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Referring now to the drawings of FIGS. 1 to 5, an embodiment of the present invention will be described.

Figure 1:
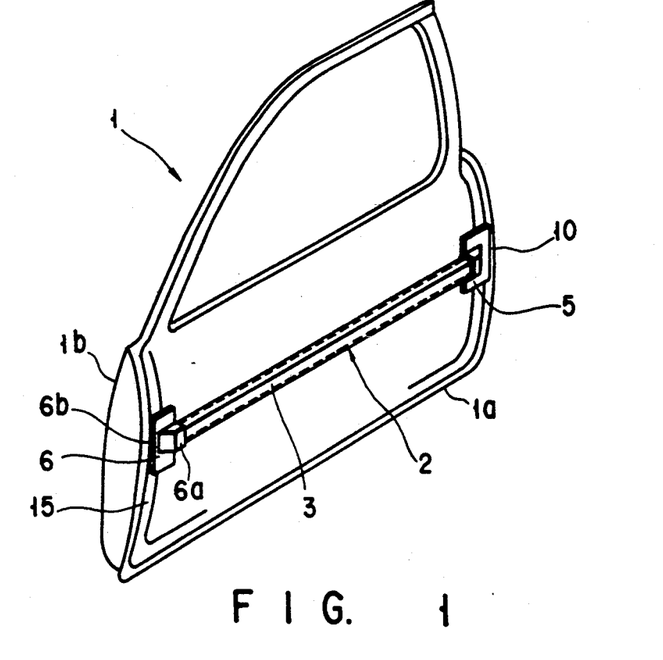
FIG. 1 is a perspective view of a door with a door impact beam according to an embodiment of the present invention.

As shown in FIG. 1, a door impact beam 2 according to the present invention is provided in a door 1 of an automobile. A panel structure, which constitutes the lower half of the door 1, is composed of an outer panel 1a and an inner panel 1b. In this embodiment, the door impact beam 2 comprises a beam body 3, extending in the longitudinal direction of the automobile, and brackets 5 and 6 welded individually to two opposite ends of the body 3 with respect to the lengthwise direction thereof.

Figure 2:
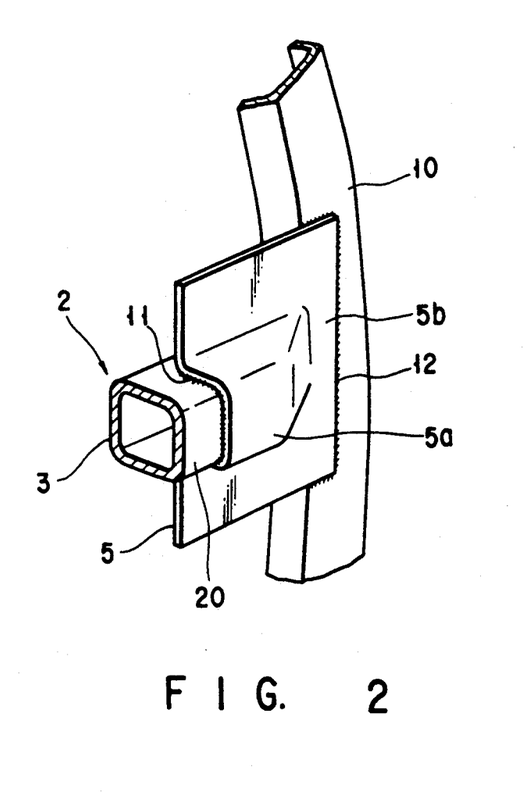
FIG. 2 is a perspective view showing an end portion of the door impact beam shown in FIG. 1 and part of a door.

The brackets 5 and 6 are each formed of a high-strength steel sheet with improved formability for automobile structural uses, such as SPFC 60 (Japanese Industrial Standard G3135). As shown in FIG. 2, the one bracket 5 is fixed to a door panel rear portion 10 by welding. This bracket 5 includes a portion 5a shaped corresponding to the external shape of the beam body 3 and a flat plate portion 5b fixed to the door panel rear portion 10. In FIG. 2, numerals 11 and 12 denote welds, individually.

The other bracket 6 is welded to a door panel front portion 15. This bracket 6 also includes a portion 6a shaped corresponding to the external shape of the beam body 3 and a flat plate portion 6b fixed to the door panel front portion 15. Alternatively, the brackets 5 and 6 may be fixed individually to suitable reinforcing members (not shown) which are arranged on the door panel front and rear portions 10 and 15.

Figure 3:
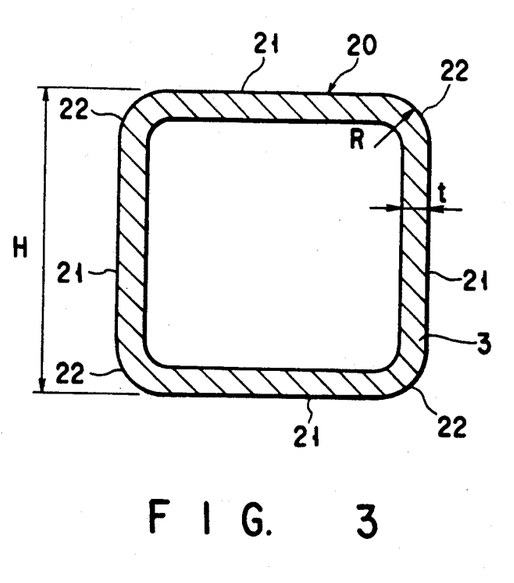
FIG. 3 is a sectional view of a beam body of the door impact beam shown in FIG. 1.

The beam body 3 is formed of a heat-treated hollow member 20. As shown in FIG. 3, the section of the member 20 is in the form of a square frame having flat sides 21 of equal lengths and rounded corners 22. If the outer radius of curvature of each corner 22 and the wall thickness of body 3 are R and t, respectively, the radius R is adjusted to a value such that there is a relation $1.5\ t \leq R \leq 3.5\ t$, for the following reason.

The wall thickness t of the hollow member 20 is uniform with respect to the lengthwise direction (axial direction) of the member 20. Referring to FIG. 3, a dimension H is 30 mm or 34 mm, the thickness t is 2.8 mm, and an example of the radius of curvature R is 6 mm. Boron-containing carbon steel is an example of a material for the hollow member 20, which is heat-treated by induction hardening. If necessary, tempering may be carried out after the hardening. Further, the hollow member 20 can be heat-treated by a method other than induction hardening.

Figure 4:
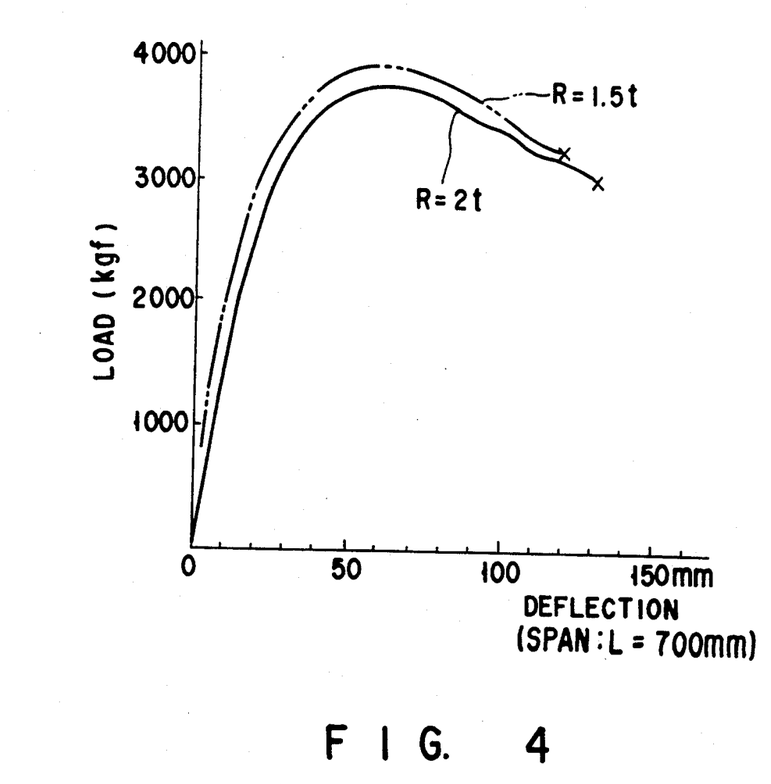
FIG. 4 is a diagram showing the relationships between the deflection and load of the door impact beam shown in FIG. 1.

According to a test conducted on the hollow member 20 under conditions H=34 mm and wall thickness t=3 mm, a characteristic curve for R=6 mm=2 t is broken when deflection is nearly 130 mm, as indicated by full line in FIG. 4. In the case of a hollow member with the same wall thickness (t=3 mm) and R=4.5 mm=1.5 t, in contrast with this, breakage is caused when the deflection is nearly 120 mm, as indicated by two-dot chain line in FIG. 4. In other words, the larger the value R with the load fixed, the greater the deflection before breakage can be. A similar test indicates that in the case of a member with R=1 t=3 mm, the deflection before breakage is substantially the same as in the case of a conventional square pipe, and breakage is caused by a smaller deflection.

Figure 5:
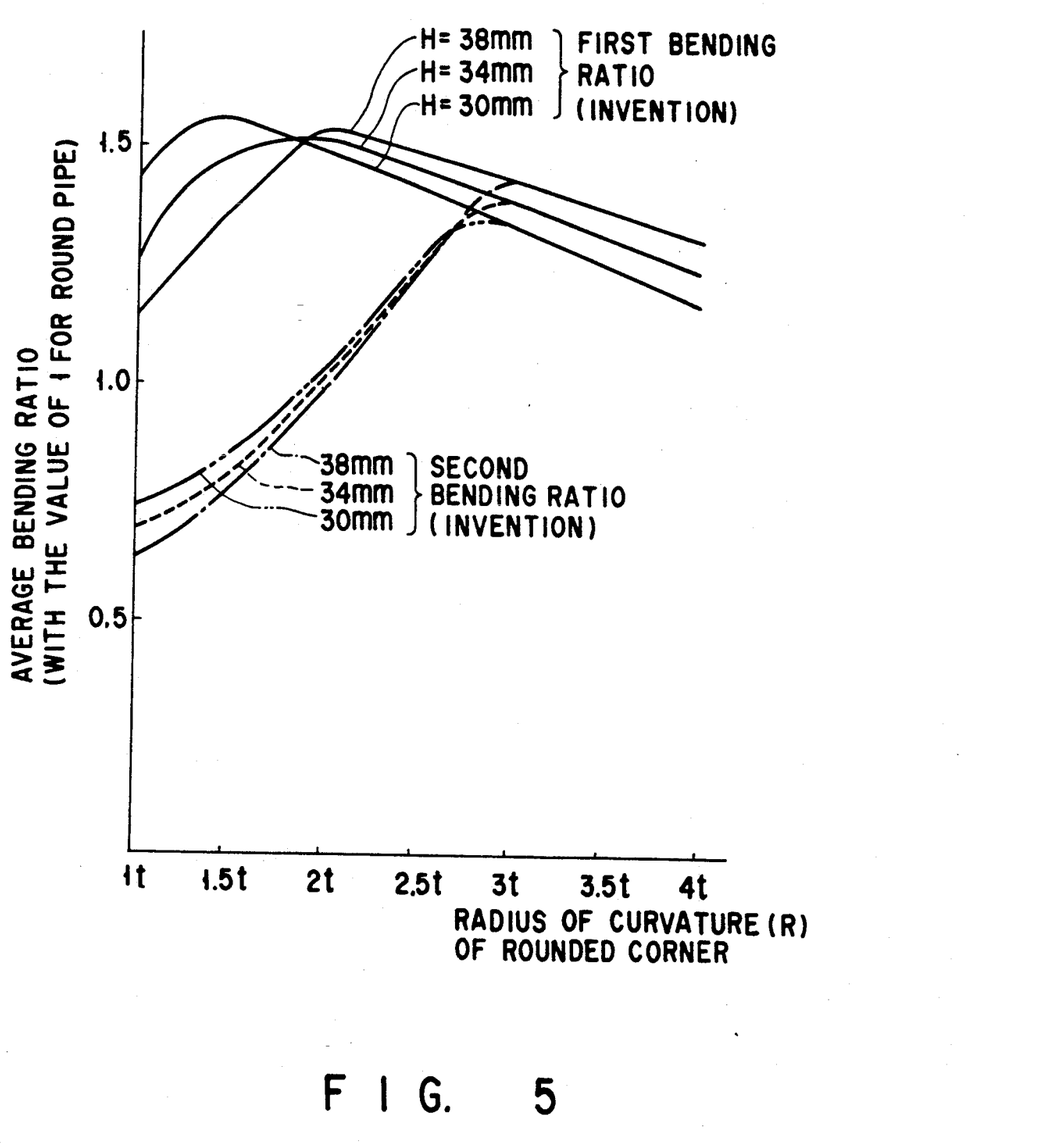
FIG. 5 is a diagram showing the relationships between the radius of curvature R of each corner and bending ratios.

FIG. 5 shows the way first and second bending ratios vary as the radius of curvature R is changed from 1 t to 4 t. The first bending ratio is the ratio of the average of loads cumulatively required in bending the beam to 6 inches (15.24 cm) to that for a round pipe with the same outer dimensions. The second bending ratio is the ratio of the average of loads cumulatively required in bending the beam to 12 inches (30.48 cm) to that for the round pipe with the same outer dimensions. Where R ranges from 1.5 t to 3.5 t, as shown in FIG. 5, it can cover both the respective maximum values of the first and second bending ratios, and the first bending ratio exceeds that of the round pipe with an allowance for dispersion. If the value R exceeds 4 t, the characteristics of the beam resemble those of the round pipe so much the beam is subject to the aforementioned drawback of the round pipe. For this reason, the relationship between R and t is restricted within the aforesaid range.

Figure 6:
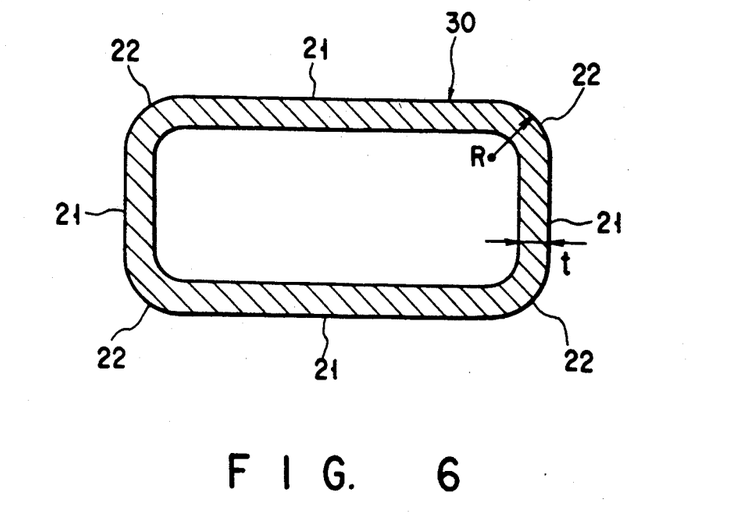
FIG. 6 is a sectional view showing a modification of the beam body.
Figure 7:
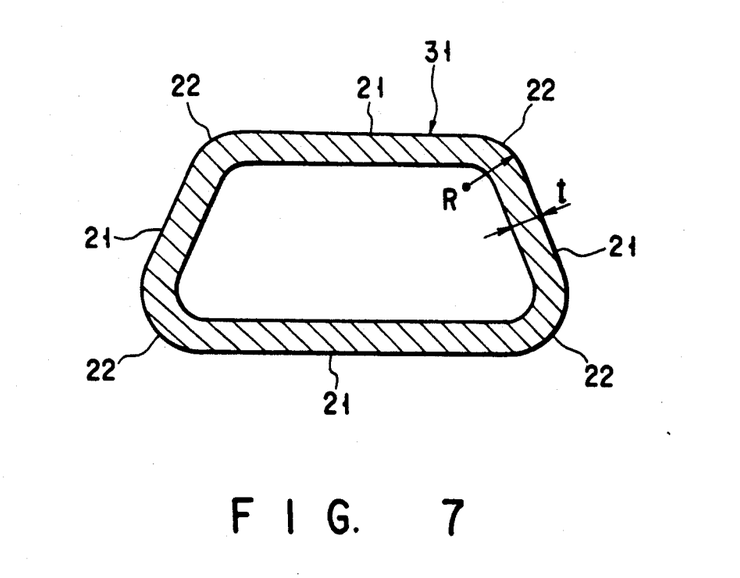
FIG. 7 is a sectional view showing another modification of the beam body.

The present invention may be also applied to a section in the form of a rectangular frame having four rounded corners 22, like that of a hollow member 30 shown in FIG. 6. Alternatively, the invention may be applied to a section in the form of a trapezoidal frame having four rounded corners 22, like that of a hollow member 31 shown in FIG. 7. Also in these modifications, the value R is set so that there is the relation $1.5\ t \leq R \leq 3.5\ t$.

Figure 8:
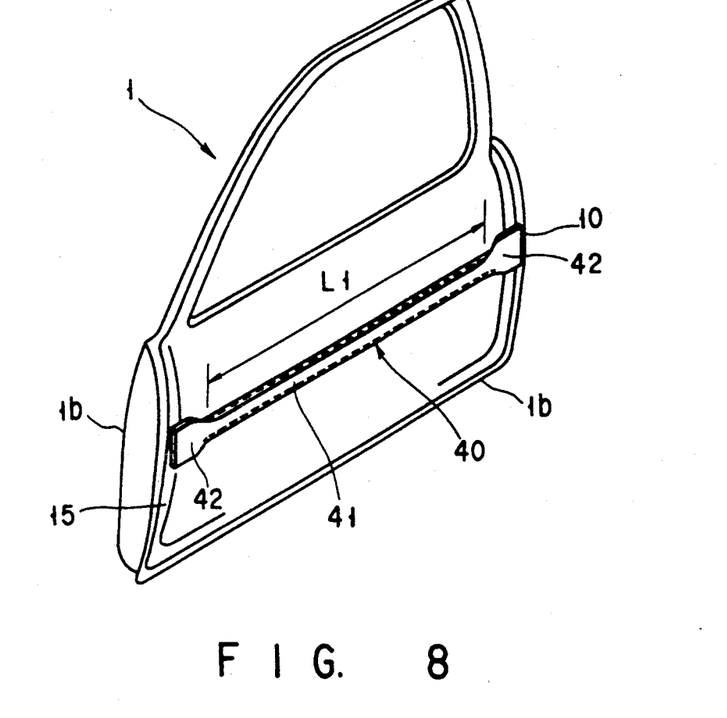
FIG. 8 is a perspective view of a door with a door impact beam according to another embodiment of the invention.
Figure 9:
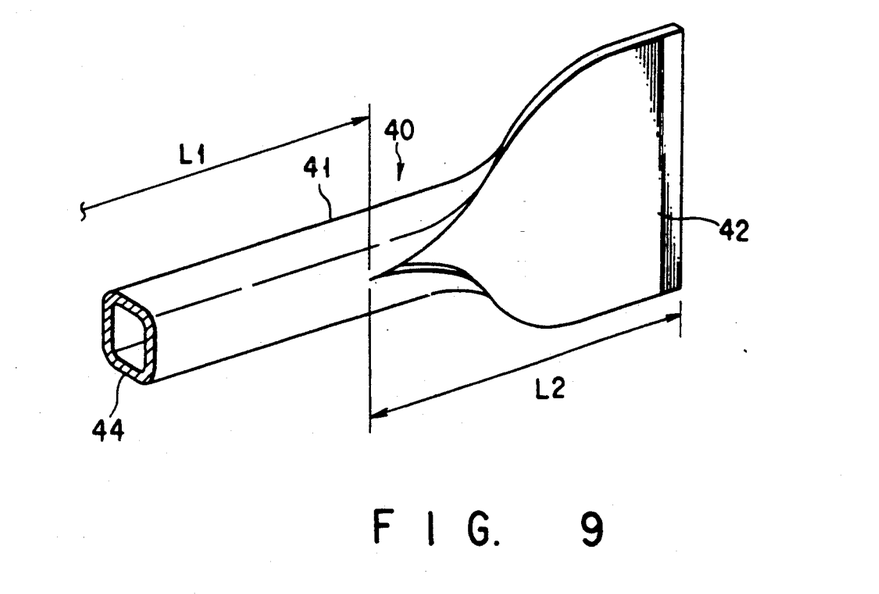
FIG. 9 is a rear perspective view showing an end portion of the door impact beam shown in FIG. 8.

FIG. 8 shows another embodiment of the present invention. A door impact beam 40 of this embodiment comprises a beam body 41 having a length L1 and a flat portions 42 arranged individually at two opposite ends of the body 41. The beam body 41 and the flat portions 42 are formed of an integral hollow member 44. The member 44 has the same section and material as that of the foregoing first embodiment. As shown in FIG. 9, each flat portion 42 is formed by cutting each end portion of the hollow member 44 open for a length L2 and then flattening it. The flat portions 42 are welded to the door panel front and rear portions 10 and 15, individually. The beam body 41 is heat-treated in the same manner as the beam body 3 of the foregoing embodiment. It is advisable not to heat-treat the flat portions 42.

The flat portions 42 can be heat-treated, but need not be heat-treated since they are not required to be so strong as the beam body 41. Preferably, they are formed by heat-treating the hollow member 44, except for both end portions, and by cutting the end portions open.

Figure 10:
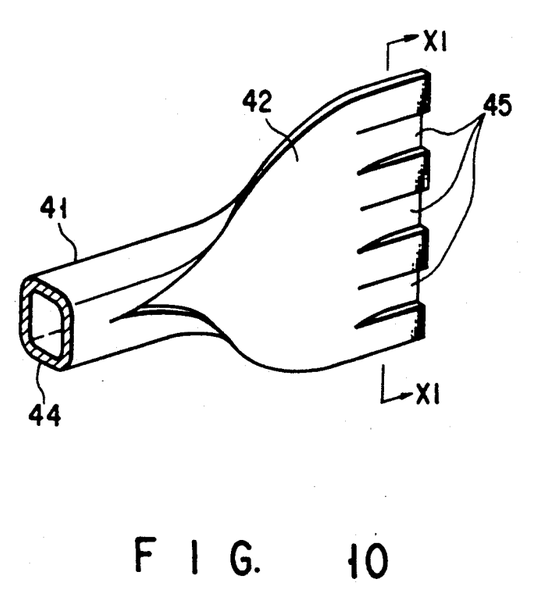
FIG. 10 is a perspective view showing a modification of the end portion of the door impact beam.
Figure 11:
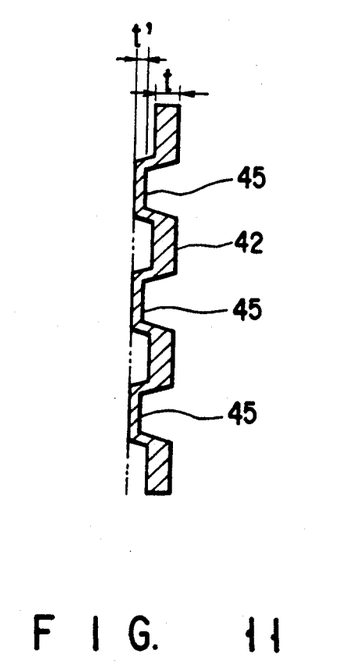
FIG. 11 is a sectional view taken along line XI—XI of FIG. 10.

In a modification shown in FIG. 10 and 11, the each flat portion 42 has a plurality of thin-walled portions 45 formed by press molding. The portions 45, which are thinner than the wall of the hollow member 44, are spot-welded to the door panel rear or front portion 10 or 15. Preferably, therefore, the wall thickness t' of the thin-walled portions 45 for spot welding should be 1.5 mm or less.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A door impact beam for use in a door panel structure designed for use in an automobile, the door panel structure having an outer panel and an inner panel, said door impact beam comprising;
   a beam body including a heat-treated steel hollow member having two opposite end portions;
   said beam body being arranged along a longitudinal direction of the automobile;
   said beam body having a section thereof in the form of a quadrilateral frame including:
      four side portions and four rounded corners respectively separating said four side portions, said four side portions and said four rounded corners having a common thickness;
      an outer radius of curvature R of each of said four corners being within a range of $1.5\ t \leq R \leq 3.5\ t$, where t is a wall thickness of the hollow member; and
   attachment portions positioned respectively at first and second opposite end portions of the beam body, said attachment portions being fixed to a structural portion of the door panel.

2. A door impact beam according to claim 1, wherein each said attachment portion comprises a bracket welded to the beam body.

3. A door impact beam according to claim 2, wherein:
   said beam body is formed of a hardened steel pipe, and said bracket is formed of a non-hardened high-strength sheet of steel that has a formability characteristic usable for forming automobile structural components.

4. A door impact beam according to claim 1, wherein each of said attachment portions comprises a flat portion formed by cutting open each of said two opposite end portions of the hollow member for a predetermined length and then flatting each thus opened end portion.

5. A door impact beam according to claim 4, wherein said beam body and said flat portions are formed of one steel pipe such that only the beam body is hardened.

6. A door impact beam according to claim 4, wherein each of said flat portions has a plurality of thin-walled portions that are thinner than a wall portion of the hollow member, the thin-walled portion of each of said flat portions being fixed to the door panel structure by at least one spot weld.

7. A door impact beam according to claim 1, wherein the section of said beam body is in the form of a square frame having four sides of equal lengths and four rounded corners.

8. A door impact beam according to claim 1, wherein the section of said beam body is in the form of a rectangular frame having four sides and four rounded corners.

9. A door impact beam according to claim 1, wherein the section of said beam body is in the form of a trapezoidal frame having four sides and four rounded corners.

* * * * *

UNITED STATES PATENT AND TRADEMARK OFFICE
CERTIFICATE OF CORRECTION

PATENT NO. : 5,232,261

DATED : August 3, 1993

INVENTOR(S) : Shigeru KURODA et al

It is certified that error appears in the above-identified patent and that said Letters Patent is hereby corrected as shown below:

On the title page, item [57] Abstract:

line 6, "member steel" should be --steel member--.

Signed and Sealed this

Sixth Day of September, 1994

*Attest:*

BRUCE LEHMAN

*Attesting Officer*    *Commissioner of Patents and Trademarks*